United States Patent
Schulze

(10) Patent No.: US 6,945,511 B2
(45) Date of Patent: Sep. 20, 2005

(54) GAS SOCKET

(75) Inventor: Klaus Schulze, Gernrode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 180 days.

(21) Appl. No.: 10/433,142

(22) PCT Filed: Nov. 27, 2001

(86) PCT No.: PCT/EP01/13769
§ 371 (c)(1),
(2), (4) Date: May 30, 2003

(87) PCT Pub. No.: WO02/48597
PCT Pub. Date: Jun. 20, 2002

(65) Prior Publication Data
US 2004/0065859 A1 Apr. 8, 2004

(30) Foreign Application Priority Data
Dec. 11, 2000 (DE) .......................... 100 61 653

(51) Int. Cl.⁷ .......................... F16K 51/00; F16L 29/00; F16L 37/28
(52) U.S. Cl. .............. 251/149.8; 251/149.3; 251/149.9; 137/360
(58) Field of Search .......................... 251/149.1, 149.3, 251/149.8, 149.9; 137/360

(56) References Cited

U.S. PATENT DOCUMENTS

| | | | |
|---|---|---|---|
| 2,601,339 A | * 6/1952 | Snyder | 137/320 |
| 3,532,101 A | 10/1970 | Snyder | 137/75 |
| 3,931,829 A | 1/1976 | McWhinnie, Jr. et al. | 137/329.1 |
| 5,020,563 A | 6/1991 | Hoffman et al. | 137/75 |
| 5,111,841 A | 5/1992 | Houston et al. | 137/360 |
| 5,263,502 A | * 11/1993 | Dick | 137/360 |

FOREIGN PATENT DOCUMENTS

| | | |
|---|---|---|
| DE | 253698 | 11/1912 |
| DE | 1136294 | 9/1962 |
| DE | 1429084 | 11/1968 |
| DE | 1529035 | 9/1969 |
| DE | 2623934 | 12/1977 |
| DE | 3519933 | 12/1986 |
| DE | 9112208.2 | 1/1992 |
| FR | 2670269 | 6/1990 |
| GB | 701734 | 12/1953 |

* cited by examiner

*Primary Examiner*—Edward K. Look
*Assistant Examiner*—John K. Fristoe, Jr.
(74) *Attorney, Agent, or Firm*—Howard & Howard

(57) ABSTRACT

It shall be created a gas socket that allows a gas connector plug to get quickly connected and disconnected. When no gas connector plug is connected the gas socket should be tamper-proof and offer protection against the ingress of foreign matter. Also, the gas socket should be fit for concealed installation. Accordingly, the gas socket has a bonnet (18) that shuts the connector opening (20) at the outlet socket (3) by means of a cover (21) when the gas connector plug is disconnected, and where said cover (21) is equipped with a latching device (29). Such latching device (29) is brought into a state ready for unlatching by a first attempt to insert the gas connector plug (24), to which the cover's (21) latching device (29) is adjusted, into an uptake opening (23). At least one additional move of the gas connector plug (24) is needed to make the connector opening (20) of the outlet socket (3) accessible for the gas connector plug (24) to be connected.

9 Claims, 10 Drawing Sheets

B-B

GAS SOCKET

FIELD OF THE INVENTION

The invention relates to a gas socket in a casing that has an inlet socket to allow the receptacle to get permanently connected to a stationary gas pipe, and an outlet socket for the connection of a gas connector plug, in particular a gas hose plug. Also, the casing houses a shut-off device that opens the internal gas way after connecting the gas connector plug only if and when external tightness has been established.

BACKGROUND AND SUMMARY OF THE INVENTION

Gas sockets serve to facilitate the connection between gas pipes fixed inside buildings and a gas-operated appliance, such as a kitchen range or a drier. Using such receptacles allows any gas consumer to get connected to the gas pipe by simple means.

Gas sockets of the above mentioned kind are well known. DE 11 36 294, for example describes a so-called gas connector cock in which connection is made by inserting an appropriate gas hose connector into the connector bore at the tap cock that comprises a cock casing which houses a moveable plug. When turning the gas hose connector the gas connector cock at the same time is put in on, or off position.

In this solution there is the disadvantage that the connector bore, and in particular as regards the sealing ring sitting inside that bore, is not tamper-proof. Also, there is no protection against the ingress of foreign matter. An additional disadvantage is that if no gas hose connector is plugged in the elastic sealing ring is exposed to the light which in turn can make the material to become brittle. As a consequence of such brittleness, tightness of gas connection is no longer guaranteed. A flush mounted installation, as often desired for aesthetic reasons, is possible but entails a high expenditure of work. In addition, manufacturing is highly expensive as the cone-shaped outer surface of the moveable plug and the cone-shaped inner surface of the casing must match perfectly in order to make it gas-tight as required.

From DE 14 29 084 there is known a gas socket the casing of which houses a shut-off valve that is actuated through the gas hose connector. Said shut-off valve comprises a valve seat that can rotate and move in axial direction inside the casing towards which it is sealed off at its outer surface, and a valve disk formed at that end of a shut-off device that faces toward the gas socket's interior, and that cannot be rotated but moved inside the casing in axial direction against the reseat action of a spring.

Also, this gas socket has the same disadvantage as described herein above, i.e. it is not tamper-proof. This design specifically allows intruding foreign matter to move the valve disk against the reseat action of the spring away from its valve seat, and gas will possibly leak out as a consequence. Also, the disadvantage here is that if no gas hose connector is plugged in the elastic sealing is exposed to the light which in turn can make the material to become brittle, with the same consequences as already described herein above. Also this device is not designed for a flush mounted installation.

Another type of gas socket, that also has proved to be reliable in practice, is described in DE 35 19 933 A1. Here, the gas socket is equipped with tube-shaped gas forward body, that can be adjusted by turning inside the casing, to take up a gas connector plug, and an intake port that is arranged at a right angle to the gas forward body. The shut-off device comprises a ball that can turn on the gas forward body's longitudinal axis, and an rectangular port inside that ball. The gas forward body's intake end, which is coupled to the ball to rotate in the same way, protrudes into the ball port's outlet end. The ball's surface rests on two elastic sealing rings that are located diametrical on the casing's walls, seen in longitudinal direction of the intake port. One of theses sealing rings is attached at a tube socket that is inserted in the intake port and serves to press the sealing ring against the ball.

The disadvantage even in this solution is that the connector bore hole is not tamper-proof, in particular as regards the sealing ring inside that hole. Also, foreign matter is not prevented from ingress, and the sealing ring is not protected against exposure to light. An additional disadvantage is the fact that the inserted tube socket requires an extra sealing joint, with a rather high extra expenditure of work. Flush mounting is not possible with this device, too.

In contrast to the above, the solution described in DE 91 12 208 U1 is a gas socket the design of which is the same as already described, in particular in DE 35 19 933 A1, but is specifically designed for use in concealed installations. For this purpose, the casing has a threaded intake socket for a screw connection with coupling ring and can be installed in, and removed from a box designed for flush mounting. The opening to house the gas connector plug is provided in the removable front cover of the box. Also, a nozzle is provided in one of the side walls of the box. The nozzle's end protruding outside the box can be connected to the gas pipe whereat the nozzle's end inside the box is equipped with the coupling ring that can be connected to the intake socket.

Apart from its usability in flush mounted installations, this gas socket comes with the same disadvantages as known from the device described in DE 35 19 933 A1. Also known are plug-in couplings of all sorts that cover up the outlet socket's connector opening when the gas connector plug is removed. Especially use of flaps is found in various variants.

For instance, the printed patent specification DE 253 698 uses a rotatable flap to shut the opening provided in the bonnet; the rotatable flap can be brought in open or closed position by an attached lever that sideways protrudes from the bonnet. In DE 26 23 934 B2, a tilting flap is used to cover the opening, whereat use of a spring-type flap is known from the printed patent specification U.S. Pat. No. 3,931,829. All these devices have in common that their covers do not have any locking device.

DE-AS 15 29 035 describes a plug-in-coupling in which the intake opening is shut by ring segments. The ring segments are fixed in such a way that when turning the shutter ring these segments are tilted away, and make the intake opening accessible. Additionally, the shutter ring is hold in closed position by a latching device that can be released only by means of a key.

The disadvantageous feature in this solution is that the latching device must be separately actuated, that is to say the intake opening can be made accessible without using the appropriate gas connector plug.

The invention is based on the problem of developing a gas socket of the mentioned kind that allows a gas connector plug to get quickly connected and disconnected. When no gas connector plug is connected the gas socket should be tamper-proof and offer protection against the ingress of foreign matter. Also, the gas socket should be fit for concealed installation. According to the present invention, the problem is solved by providing the gas socket with a bonnet that shuts the connector opening at the outlet socket by means of a cover when the gas connector plug is disconnected, with such cover being equipped with a latching device. The latching device is brought into a state ready for unlatching by a first attempt to insert the gas connector plug, to which the cover is adjusted, into an uptake opening. At least one additional move of the gas connector plug is needed to make the connector opening of the outlet socket accessible for the gas connector plug to get connected.

This solution, therefore, constitutes an approach that removes the disadvantages of the prior art as described above. By its latching device, the gas socket is safely protected against tampering. Also, the ingress of foreign matter is prevented.

Other advantageous arrangements of the invention can be found in the other patent claims. It proved especially advantageous to form the latching device from two or more blocking elements that are acting independently from each other. Preferably, such blocking elements should be provided in a single-piece design in which each of them are attached to the cover.

Placing the elastic sealing elements, which are necessary to make the device gastight towards the environment, onto the outlet socket makes sure that the cover offers an absolute protection to said elements from being exposed to light, which in turn avoids the possible risk of embrittlement and, as a consequence, gas leaking from the device.

It proved extremely advantageous in the manufacturing process if the cover was formed be a slider that can move vertically to the outlet socket's axis, with the axes of intake opening, which is formed by bonnet and cover, and outlet socket being staggered.

In another advantageous arrangement, the latching mechanism has at least one blocking element, consisting of one spring leg attached to the slider, where the leg's end is in form of a catch hook, and a holding device provided in a single-piece design that is connected to the bonnet and serves to lock the catch hook into place. By an additional protrusion provided on the external side of each leg together with a limit stop inside the bonnet, that serves to delimit the protrusion's motion when the leg moves against the reseat action of the spring, the latching device is effectively prevented from being unlatched if the acting forces are outside of the action points where they should be when inserting the gas connector plug, as it may be in case of attempted tampering.

In other slightly changed design versions, the cover forming slider can move in an angle to the outlet socket's axis, or the cover is formed by two or more flaps, instead of a slider.

BRIEF DESCRIPTION OF THE DRAWINGS

The gas socket according to the present invention is described below by means of some practical examples and is illustrated in the following figures.

DETAILED DESCRIPTION OF THE INVENTION

Figure 1:
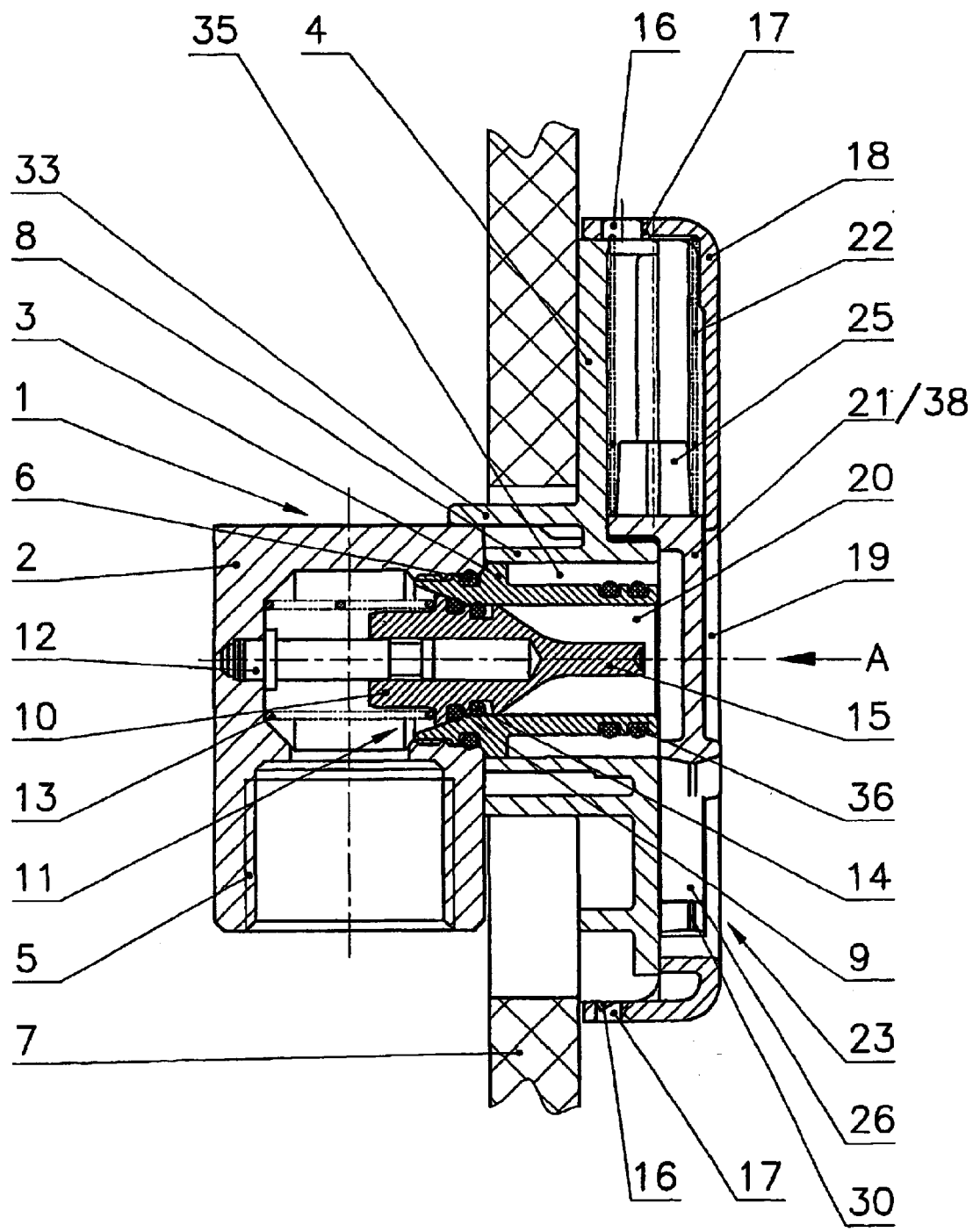
FIG. 1 is a gas socket in an off position illustrated as a sectional view

A gas socket, according to the present invention in form of a design version fit for concealed installation shown as sectional view in FIG. 1, has a multi-piece casing (1) that comprises a base body (2), an outlet socket (3) and a base plate (4).

The base body (2) has an integrated intake socket (5) which—in this case—is equipped with a female thread to allow a permanent connection between the gas socket and a stationary gas pipe (not shown). The outlet socket (3) is screwed into the base body (2), at a right angle to the intake socket's (5) axis, and an O-ring seal (6) added to make sure that the unit is gas-tight to the environment.

The base plate (4) that also belongs to the casing (1) and is arranged parallel to the intake socket's (5) axis, serves as a shoulder to be attached to a schematically shown curtain wall (7) as in many cases used, in particular in domestic buildings, to which the unit can be fixed in a commonly accepted way, for example, by using screws and dowels. A tube-shaped collar (8) that protrudes into the curtain wall (7) surrounds the outlet socket's (3) shell outside surface, which protrudes from the base body (2), in a well defined distance as described in greater detail herein below. A holding rib (33) which partly surrounds the base body (2)—in this practical example on three sides—serves as a dust protector as well as an additional safety device against torsion, especially at installation work. The base plate (4) is attached to the base body (2) by screws (not shown in this example) and in this way forms, together with the outlet socket (3), a complete casing (1).

The outlet socket's (3) end that protrudes into the base body (2) forms a valve seat (9) for a shut-off device (11) the closing body (10) of which is placed inside the base body (2) supported by a guide piece (12) so that it can travel longitudinal to the outlet socket's axis, as well as to the valve seat (9). During its travel, the closing body (10) is loaded in closing direction under the force exercised by a closing spring (13), the one end of which rests on the base body's (2) inner side, and the other one on the closing body (10). The O-ring seals (14), which are situated on the closing body and are resting on the valve seat (9) in off position, are to make the device gas-tight. The closing body's (10) axial extension (15) projects into the outlet socket (3).

The base plate (4) fixed to the curtain wall (7) has several catch elements (16) protruding from the perimeter on which they are equally spaced. When mounting a bonnet (18) covering over the base plate (4), said catch elements will lock into assigned openings (17) provided in the bonnet (18).

Figure 2:
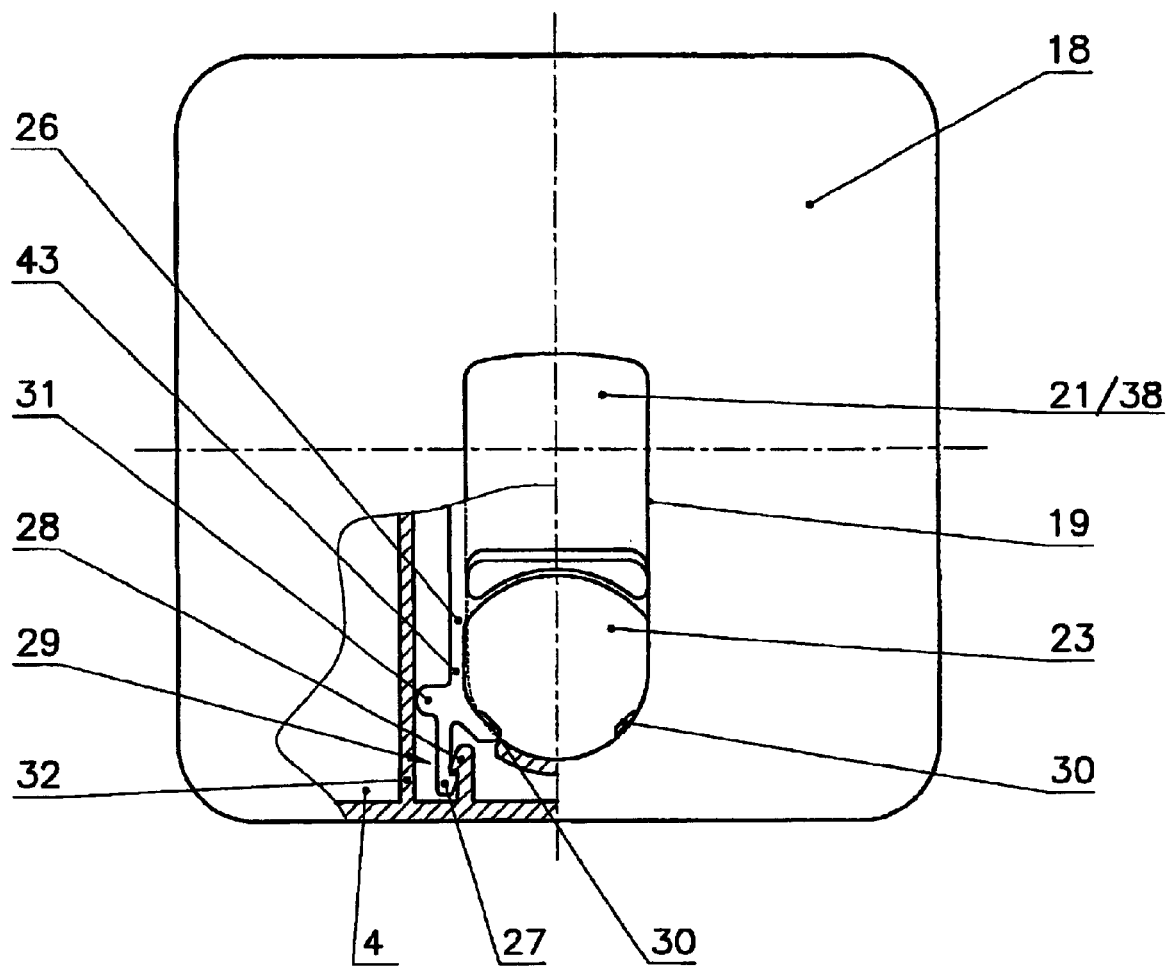
FIG. 2 is an A-view of the gas socket as shown in FIG. 1

The bonnet (18), shown in FIG. 2 in a partly cut-away view, has a long hole (19) in its front side, where the outlet socket's (3) connector opening (20) is situated behind said long hole (19) covering part of it. A slider (38) that serves as a cover (21) is situated between bonnet (18) and base plate (4) where it is guided so that it can freely move along its longitudinal axis. A spring (22), the one end of which rests on the bonnet (18) and the other one on the slider (38), exercises forces in the slider's (38) moving direction, and by doing so causes the slider (38) to close the long hole's (19) area that makes the outlet socket's (3) connector opening (20) accessible in such a way that the slider (38) and the non-closed long hole (19) area form a precisely dimensioned uptake opening (23) to take up a gas connector plug (24).

Figure 3:
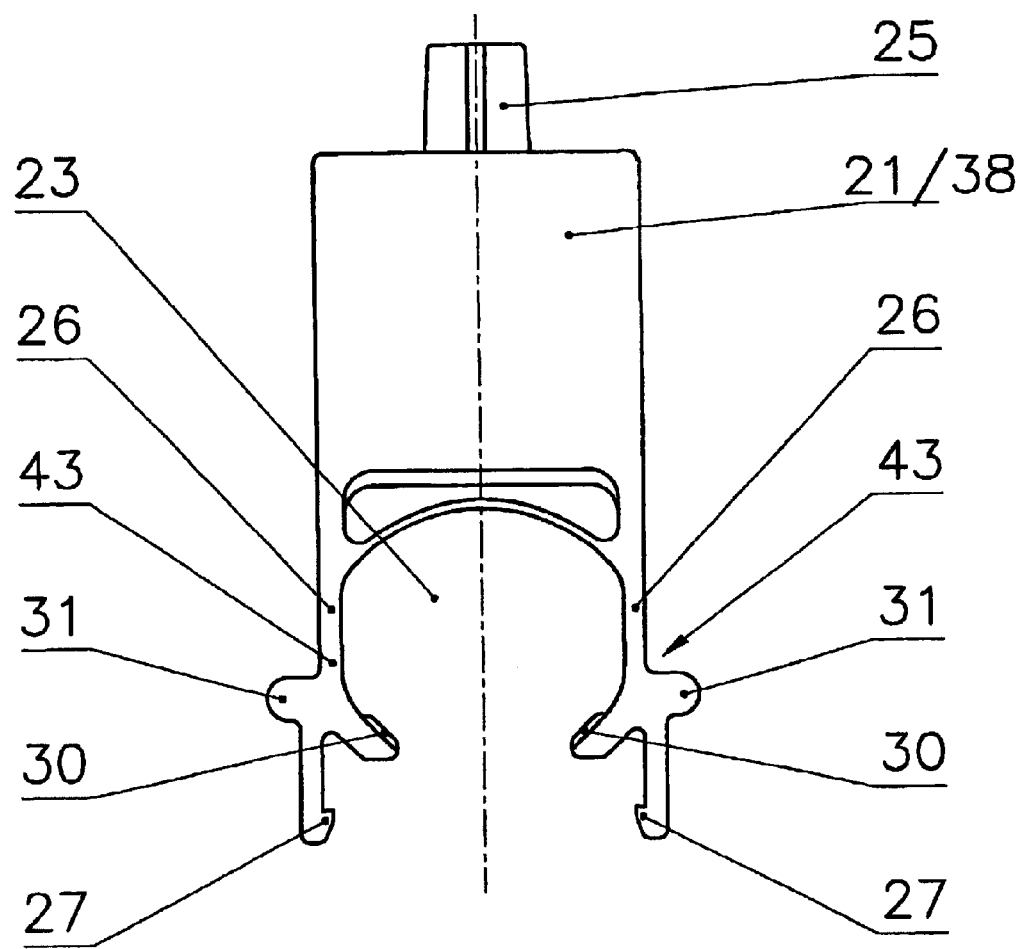
FIG. 3 is an illustration of the slider, as shown in FIG. 1, serving as a cover

The rectangular slider (38), as shown in FIG. 3 as a separate detail, has on one of its two face sides a dome (25) formed by two crossing ribs that serve to take up, and at the same time guide the spring's (22) end facing the slider (38). The slider's (38) face side opposite the dome (25) ends in two latching elements (43) each formed by a spring leg (26) ending in a catch hook (27). With the slider (38) being loaded by the spring (22), the latching elements (43) together with the holding elements (28), that are provided in a single-piece design connected to the bonnet (18), and behind which the catch hooks (27) are locked in place, form a latching device (29) that prevents the slider (38) from moving in longitudinal direction, and opening the long hole's (19) area that covers the outlet socket (3). (cf. FIG. 2)

Inside the area of uptake opening (23) formed by the inner sides of the legs (26), each of these legs (26) has at its lower end of the uptake opening's (23) contour an arching (30) pointing towards the interior part in radial direction. Said arching (30) is sized in such a way that when the gas connector plug (24) is plugged-in the two legs (26) open against the reseat action of the springs so wide so that the catch hooks (27) are no longer held in latching position.

Above the arching (30), each leg (26) has on its external side a protrusion (31), which is delimited in its motion by a rib that serves as a limit stop (32) when the leg (26) moves against the reseat action of the spring.

The way the gas socket works as shown in this practical example is described herein below:

FIGS. 1 & 2 depict the gas socket in off position, and latched. Here, the outlet socket's (3) connector opening (20) is covered up by the slider (38). An opening, that is to say a longitudinal move of the slider (38), is prevented by the latching device (29).

Figure 4:
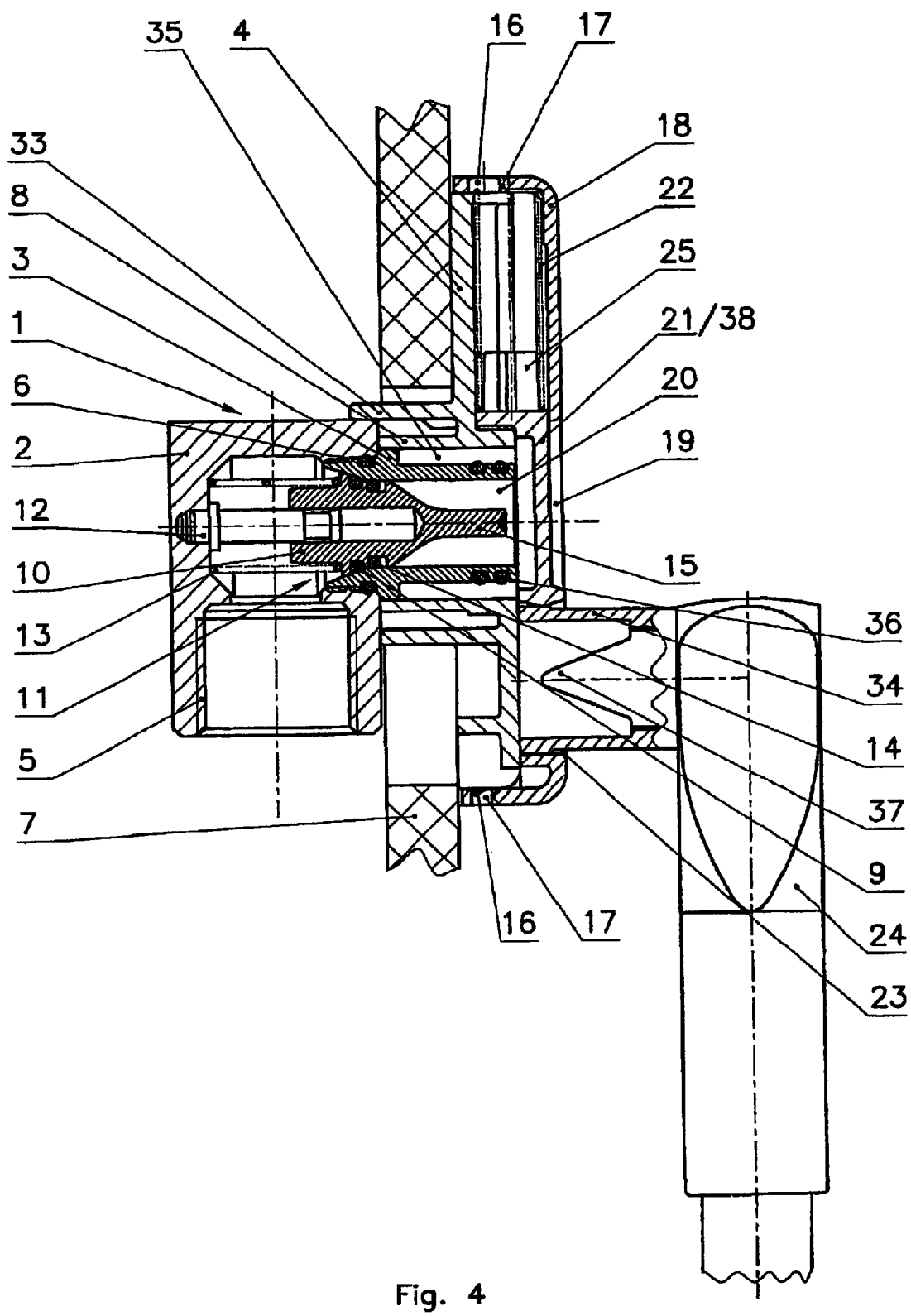
FIG. 4 is a gas socket in an off position illustrated as a sectional view, as shown in FIG. 1, together with a gas connector plug, with the cover being in closed position

As can be seen from FIG. 4, a gas connector plug (24) the tube-shaped connector contour (34) of which is adjusted to the latching device (29) of the gas socket described here is fully pushed into the uptake opening (23) down to the base plate (4) in a first move. This causes the archings (30) which in their starting position are projecting into the uptake opening (23) as can be seen from FIG. 2 to be pushed away by the legs (26) that are moving against the reseat action of a spring, and as a consequence of the same the latching device (29) is brought into an unlatched position.

The protrusions (31) serve to prevent the latching device (29) from being unlatched when radial expansion forces outside the archings (30) are applied to the legs' (26) sections that are situated inside the uptake opening (23) as may be the case, for example, with tampering. When the legs (26) move against the reseat action of the spring, the protrusions (31) motion is delimited by an assigned limit stop (32) formed by a rib situated at the bonnet (18) and at the same time serves as pivot for the leg's (26) lower end. This not only prevents the catch hook (27) from swinging out of its catching position but even moves it as far as possible against the holding element (28) as the sense of rotation is reversed by the pivot.

Figure 5:
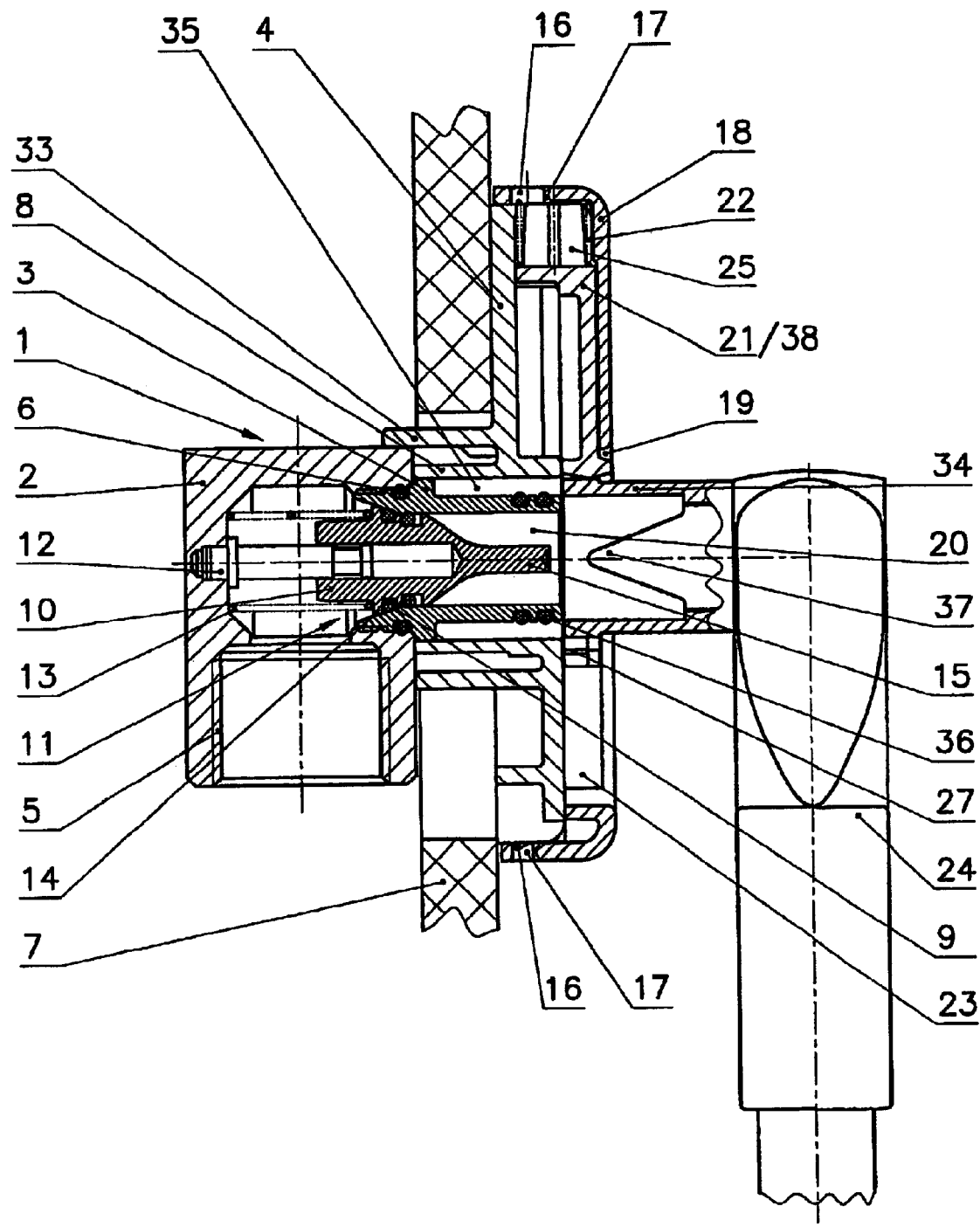
FIG. 5 is a gas socket in an off position illustrated as a sectional view, as shown in FIG. 1, together with a gas connector plug, with the cover being in open position
Figure 6:
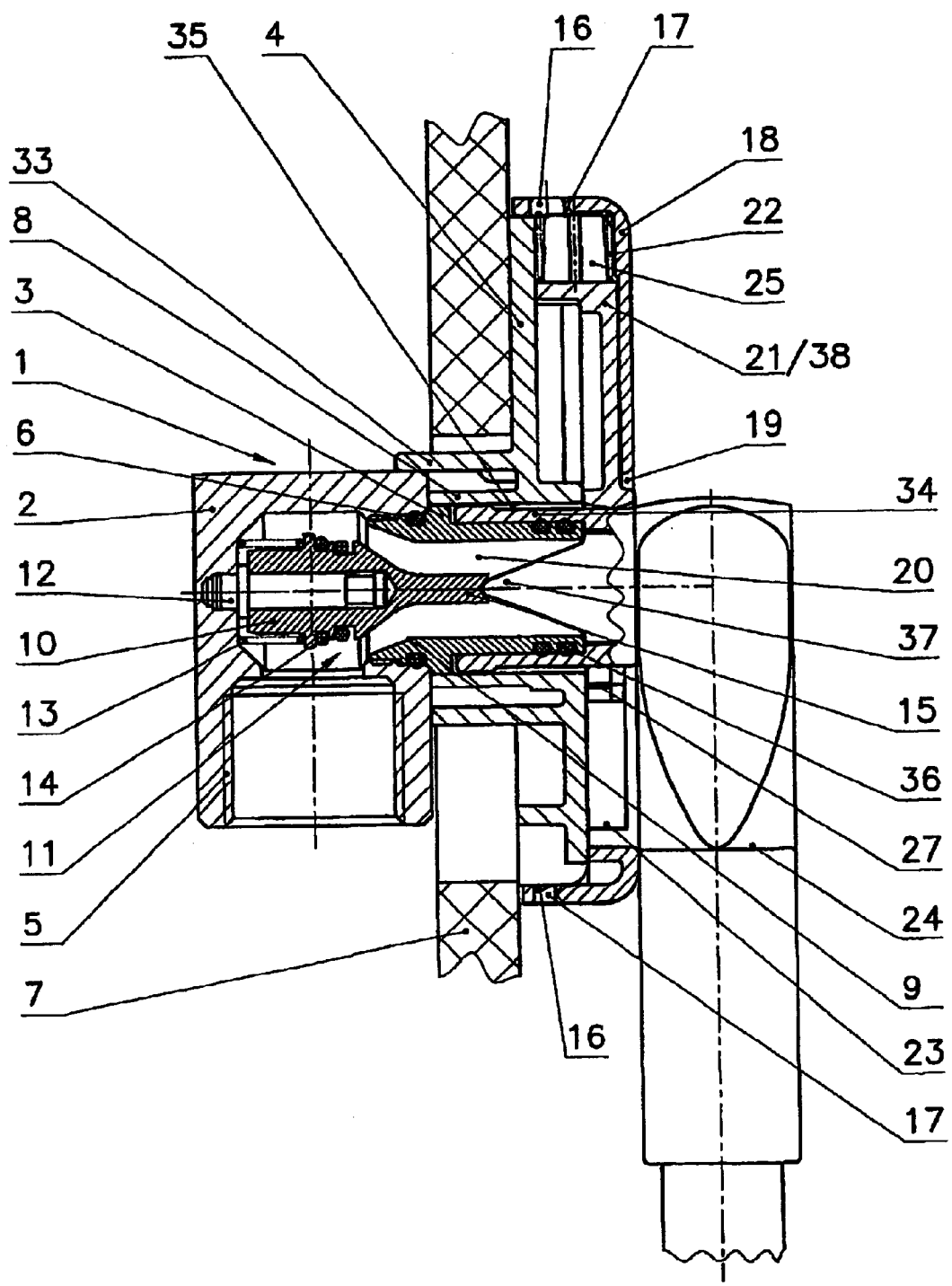
FIG. 6 is a gas socket in a on position illustrated as a sectional view, as shown in FIG. 1, together with a gas connector plug, with the cover being in open position

After this first push-in move of the gas connector plug (24), which caused the latching device (29) to be brought into an unlatched position, said gas connector plug (24) can now be shifted in a second moving direction until it reaches a position as shown in FIG. 5. In doing so, the slider (38) is shifted against the reseat action of the spring (22) and makes the connector opening (20) accessible for the gas connector plug (24).

By a subsequent anew change of the gas connector plug's (24) moving direction, the connector contour (34) is pushed into the intake opening (35) that is formed by the outlet socket's (3) shell external surface and the collar's (8) shell internal surface. An elastic sealing element (36), in this case comprising O-ring seals that are placed onto the outlet socket's (3) shell external surface, guarantees the required gas tightness. Only after the unit is guaranteed to be gas tight to the environment, and with another move of the gas connector plug (24), a tappet (37) situated inside the gas connector plug (24) pushes against the extension (15) and brings the shut-off device (11) into open position, that is to say connection is made to the stationary gas pipe.

In order to disconnect this connection, just pull out the gas connector (24) in straight direction. First, the shut-off device (11) is brought into closed position. After the connector contour (34) has released the spring (22) loaded slider (38), the latter closes the outlet opening (20), and the catch hooks (27) spring back behind the holding elements (28). Now, the gas socket is closed and latched, as shown in FIGS. 1 & 2.

Figure 8:
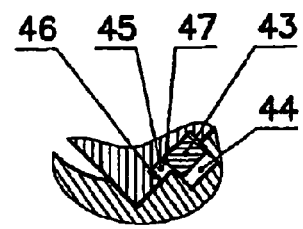
FIG. 8 is a B—B view of a detail of a gas socket as shown in FIG. 7
Figure 7:
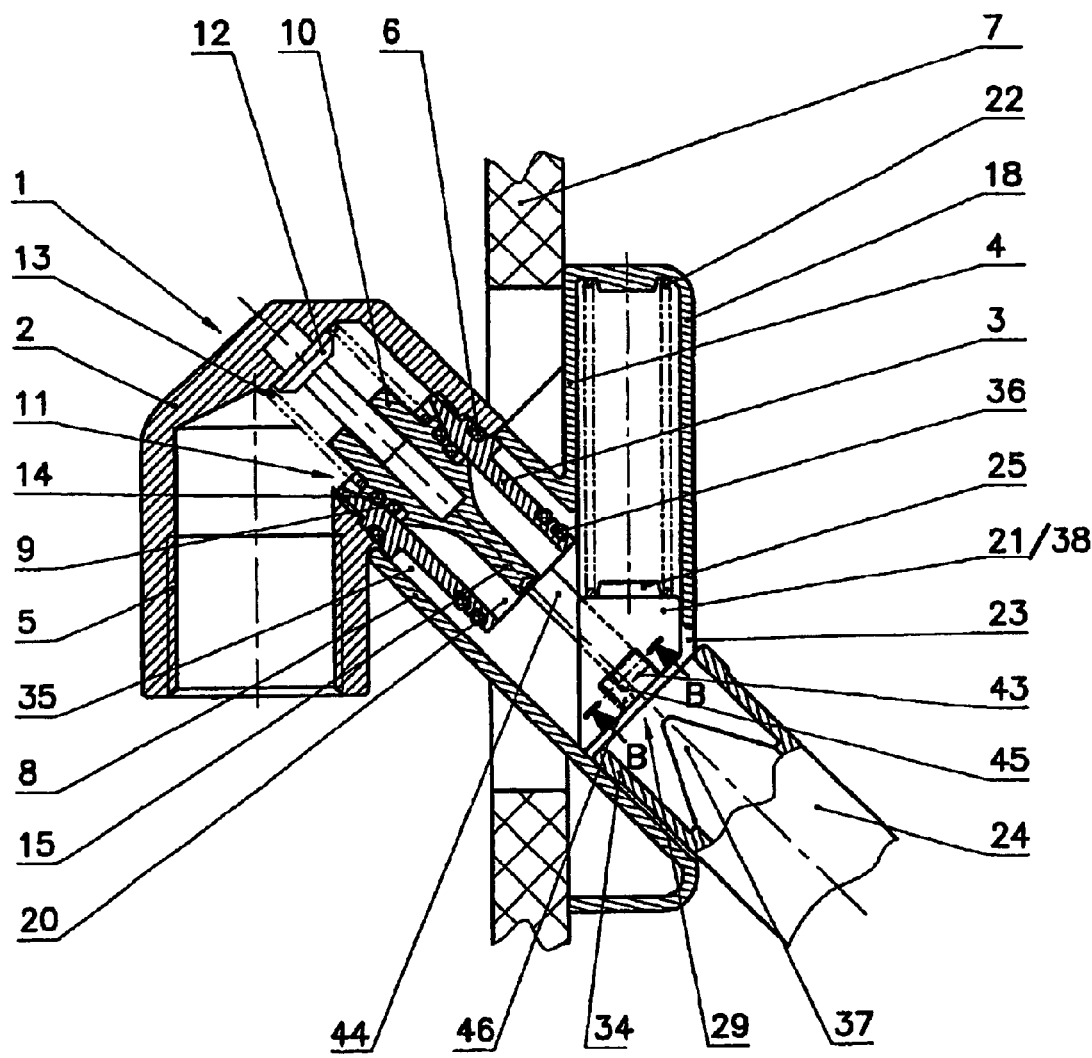
FIG. 7 is a second design version of a gas socket in an off position illustrated as a sectional view together with a gas connector plug, with the cover being in closed position
Figure 9:
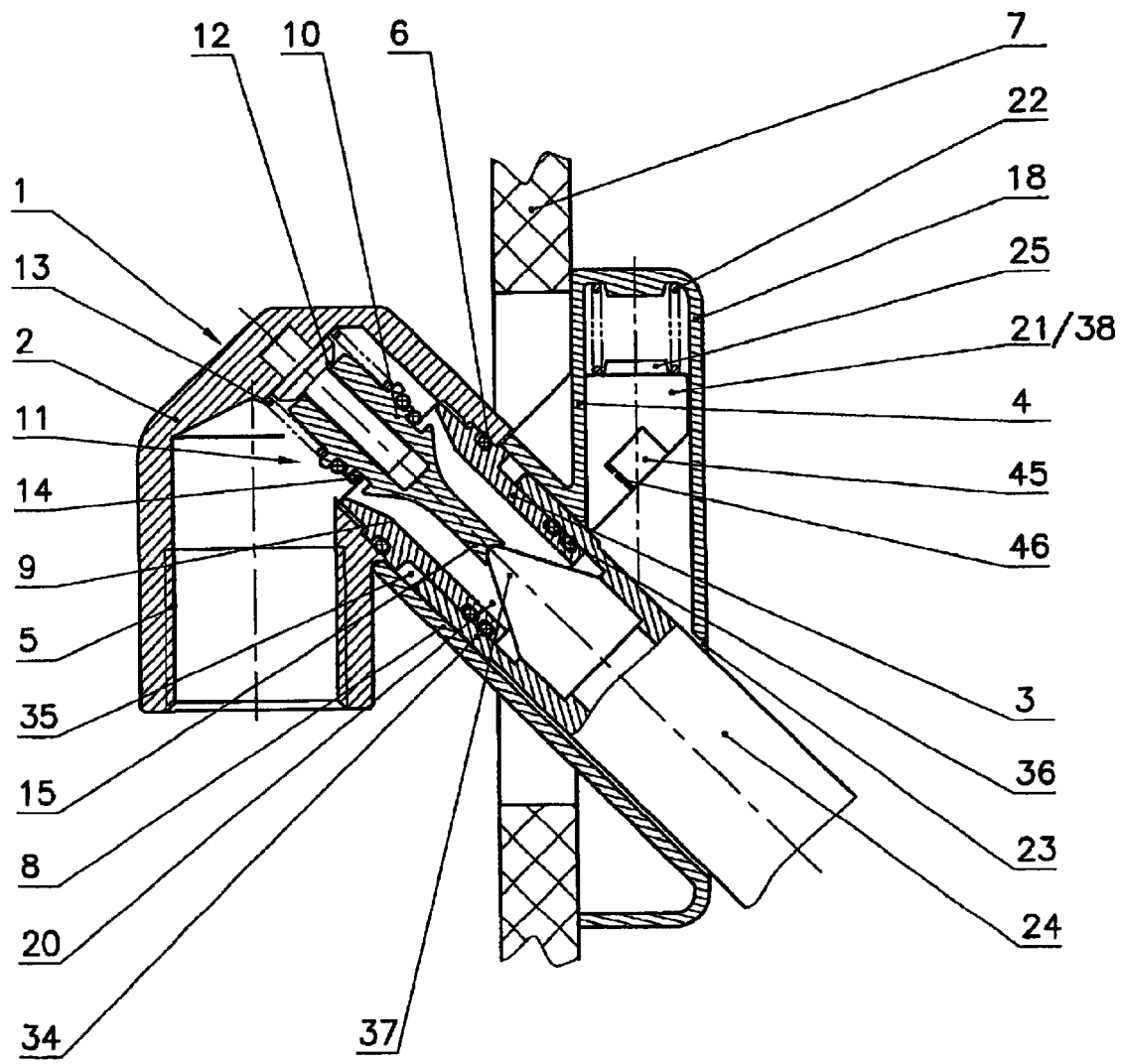
FIG. 9 is a gas socket in an on position illustrated as a sectional view, as shown in FIG. 7, together with a gas connector plug, with the cover being in open position

Another design version is shown in FIGS. 7–9. The cover (21), also in this version formed by a slider (38), can move at an angle to the outlet socket's (3) axis. This design version is advantageous in particular in such cases where straight design gas connector plugs (24) in are used so that possible kinks in the gas hose are avoided.

Also here, the base body (2) has an integrated intake socket (5) which is equipped with a female thread to allow a permanent connection between the gas socket and a stationary gas pipe (not shown). The outlet socket (3) is screwed into the base body (2), arranged other than at a right angle to the intake socket's (5) axis.

The base plate (4) that also belongs to the casing (1) and is arranged parallel to the intake socket's (5) axis, again serves as a shoulder to be attached to a schematically shown curtain wall (7). The tube-shaped collar (8) that protrudes into the curtain wall (7) surrounds the outlet socket's (3) shell outside surface, which protrudes from the base body (2), in a distance as defined by the gas connector plug's (24) connector contour (34). The outlet socket's (3) end that protrudes into the base body (2) again forms the valve seat (9) for the shut-off device (11) as described in greater detail herein above.

In this practical example, the base plate (4) fixed to the curtain wall (7) is in single-piece design connected to the bonnet (18) which covers it up. Said bonnet has on its face side, in elongation of the outlet socket's (3) longitudinal axis, an uptake opening (23) to take up the gas connector plug (24).

A slider (38) that serves as a cover (21) is situated between bonnet (18) and base plate (4) where it is guided so that it can freely move along its longitudinal axis. A spring (22), the one end of which rests on the bonnet (18) and the other one on the slider (38), exercises forces in the slider's (38) moving direction, and by doing so causes the slider (38) to shut the outlet socket's (3) connector opening (20).

In this case, as shown in FIG. 8, the collar (8) has two longitudinal grooves (44) which serve to house two radial spring latching elements (43) that are arranged opposite to each other, and are covered up by the slider (38) when the latter is loaded by the spring (22). The latching elements (43), together with their assigned catch grooves (45) situated on the slider (38) form a latching device (29) by which the slider (38) is hindered in its longitudinal travel and so prevents the connector opening (20) from being opened. As a favorable feature that can be clearly seen from FIG. 8, the catch groove (45) has an undercut, whereat the latching element (43) has a nose (47) in order to make tampering more difficult, and so prevent the connector opening (20) from making accessible.

The way the gas socket works as shown in this practical example is described herein below:

FIG. 7 depicts the gas socket in off position, and latched. Here, the outlet socket's (3) connector opening (20) is covered up by the slider (38). An opening, that is to say a longitudinal move of the slider (38), is prevented by the latching device (29). The gas connector plug (24), the tube-shaped connector contour (34) of which is adjusted to the latching device (29) of the gas socket as described here, is shown in its move towards the slider (38) awaiting its insertion.

When keeping on traveling in insertion direction, the slider (38) is shifted away in longitudinal direction against the reseat action of the spring (22), whereat at the same time the gas connector plug's (24) connector contour (34) pushes the latching element (43) down into the longitudinal groove (44) to form a flush surface. The dimensional adjustment is made in such a way that the latching element's (43) nose (46) arrives inside the longitudinal groove (44) before the nose (46) protrudes into the undercut. Now, the gas connector plug's (24) connector contour (34) can be inserted into the intake opening (35) formed by the outlet socket's (3) shell external surface and the collar's (8) shell internal surface and tailored to said contour. Like in the above example, an elastic sealing element (36) is placed onto the outlet socket's (3) shell external surface to guarantee the required gas-tightness. Only after the unit is guaranteed to be gas-tight to the environment, and with another move of the gas connector plug (24), a tappet (37) situated inside the gas connector plug (24) pushes against the extension (15) and brings the shut-off device (11) into open position, that is to say connection is made to the stationary gas pipe. (see FIG. 9)

Should, in contrast to the above, attempts are being made to tamper with the slider (38) by applying forces in its opening direction, the latching elements (43) travel against a stop inside the catch groove (45) which prevents any further motion of the slider (38) and, therefore, the connector opening (20) from making accessible.

As the nose (46) is caused by this move to rest inside the undercut (47), any further motion of the slider (38) and, as a consequence, access to the connector opening (20) is prevented even when additional attempts are made to push the accessible part of the latching elements (43), as it becomes visible by the slider's (38) first move, into the longitudinal groove (44).

Pulling out the gas connector (24) in a straight move disconnects this connection. First, the shut-off device (11) is brought into closed position. After the connector contour (34) has released the spring (22) loaded slider (38), the latter closes the outlet opening (20), and the latching elements (43) spring back into the catch-groove (45). Now, the gas socket is closed and latched, as shown in FIG. 7.

Figure 10:
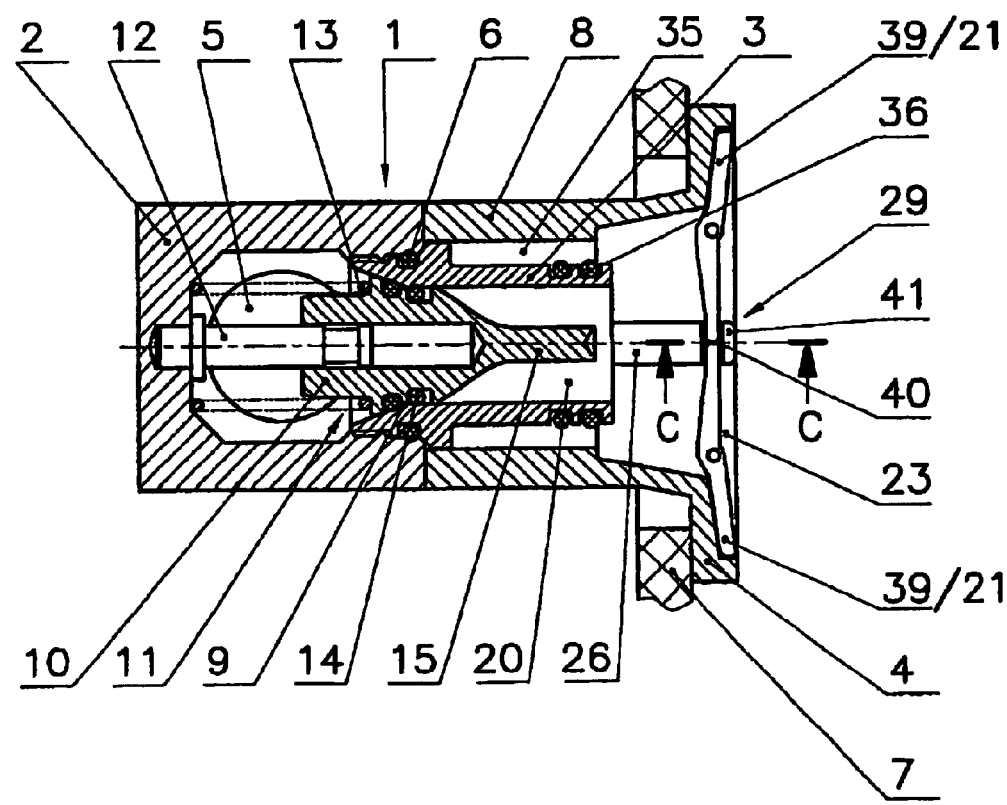
FIG. 10 is a third design version of a gas socket in an off position illustrated as a sectional view

Another version with changed design is shown in FIG. 10 as a sectional view. The figure depicts the device in its is closed and latched position. Here, two flaps (39) hinged to the base plate (4) are to serve as a cover (21), and shut-off the connector opening (20).

In this case, the latching device (29) is formed by two spring legs (26) which are fixed to the base plate opposite to each other, having an inward facing groove (40). Seen from the pivot, the inner part of the flaps (39) is locked in place inside the groove (40) against the reseat action of a (not shown) spring elements, preferably being a torsion spring.

Figure 11:
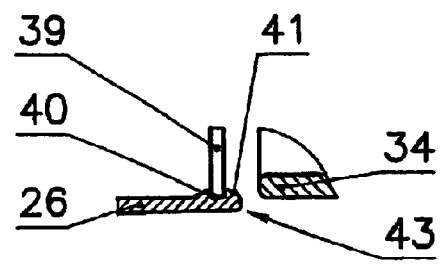
FIG. 11 is a C—C view of a detail of a gas socket as shown in FIG. 10
Figure 12:
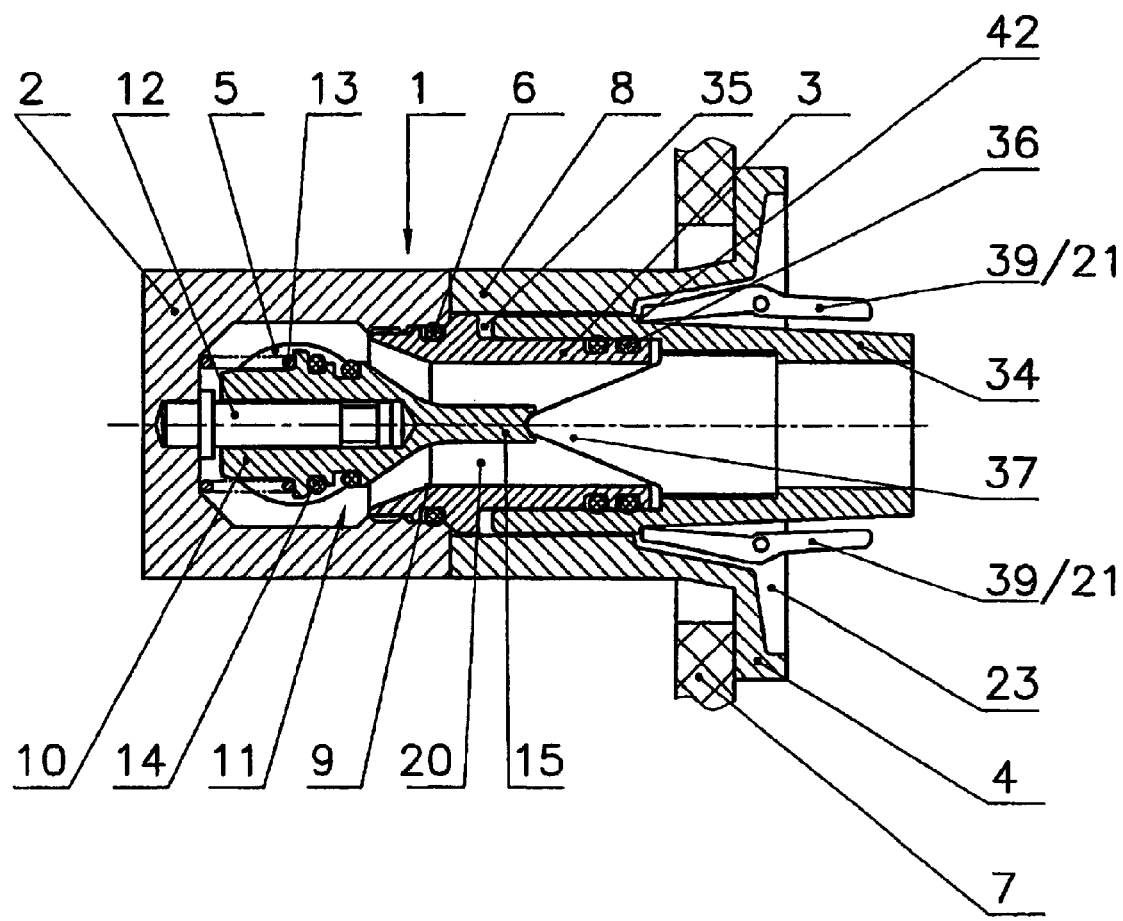
FIG. 12 is a gas socket in an on position illustrated as a sectional view, as shown in FIG. 10, together with a gas connector plug with the cover being in open position

As can be seen from the detail in FIG. 11, both size and position of the legs (26) are again tailored to match the gas connector plug's (24) connector contour (34). When moving the gas connector plug (24) over a slope (41) leading down to the groove (40), the spring leg (26) opens wide enough to bring the flaps (39) out of the groove (40). This insertion move can be continued against the reseat action the torsion spring until connection is made to the stationary gas pipe. As an advantageous feature, the connector contour's (34) shell outside surface has a shoulder (42) behind which the flaps (39) can be locked in place (cf. FIG. 12). Undoing the connection between the gas connector plug (24) and the gas socket is now only possible by an additional actuation of the flaps (39).

It goes without saying that the gas socket according to the invention is not limited to the practical examples presented herein above. For instance, the number of shut-off elements can be altered as well as the latching device's position/arrangement and/or the way it works. Also, the number of flaps can change. Furthermore, the gas socket can be altered so that it can be used in so-called surface piping installations.

List of Reference Numbers

| | |
|---|---|
| 1 | casing |
| 2 | base, body |
| 3 | outlet socket |
| 4 | base plate |
| 5 | intake socket |
| 6 | O-ring seal |
| 7 | curtain wall |
| 8 | collar |
| 9 | valve seat |
| 10 | closing body |
| 11 | shut-off device |
| 12 | guide piece |
| 13 | closing spring |
| 14 | O-ring seal |
| 15 | extension |
| 16 | catch elements |
| 17 | opening |
| 18 | bonnet |
| 19 | long hole |
| 20 | connector opening |
| 21 | cover |
| 22 | spring |
| 23 | uptake opening |
| 24 | gas connector plug |
| 25 | dome |
| 26 | leg |

-continued

List of Reference Numbers

| 27 | catch hook |
| 28 | holding element |
| 29 | latching device |
| 30 | arching |
| 31 | protrusion |
| 32 | limit stop |
| 33 | holding rib |
| 34 | connector contour |
| 35 | intake opening |
| 36 | elastic sealing element |
| 37 | tappet |
| 38 | slider |
| 39 | flap |
| 40 | groove |
| 41 | slope |
| 42 | shoulder |
| 43 | latching element |
| 44 | longitudinal groove |
| 45 | catch groove |
| 46 | undercut |
| 47 | nose |

What is claimed is:

1. Gas socket with a casing (1) that has an intake socket (5) to allow a permanent connection of the gas socket with a stationary gas pipe installation, an outlet socket (3) to take up a gas connector plug (24) and a shut-off device (11) that is situated inside the casing and opens the internal gas way after connecting the gas connector plug (24) only if and when external tightness has been established, and with a bonnet (18) that closes the outlet socket's (3) connector opening (20) by means of a cover (21), and where such cover (21) has a latching device (29) which can be unlatched when the gas connector plug (24) in a first move is inserted into an uptake opening (23) to which the cover's (21) latching device (29) is adjusted, and where the cover (21) by at least one subsequent move of the gas connector plug (24) can make the outlet socket's (3) connector opening (20) accessible for getting the gas connector plug (24) connected.

2. Gas socket according to claim 1 with a latching device (29) comprising at least one latching element (43) that is connected to the cover (21) to form one single piece.

3. Gas socket according to claim 1 or 2 with a latching device (29) comprising one or more latching elements (43) that act independently from each other.

4. Gas socket according to claim 1 equipped with elastic sealing elements (36) to make the device gas-tight to the environment, whereby such sealing elements are arranged on the outlet socket (3) where they are protected against light by the light-proof cover (21).

5. Gas socket according to claim 1 with a cover (21) formed by a slider (38) that can move vertically to the outlet socket's (3) axis, and where the axis of the uptake opening (23) formed by the bonnet (18) and the cover (21) and the axis of the outlet socket (3) are staggered.

6. Gas socket according to claim 5 the latching device (29) of which has at least one latching element (43) comprising a spring leg (26) that is attached to the slider (38) and ends up in a catch hook (27), and a holding element (28) that is connected to the bonnet (18) to form one single piece that serves to lock the catch hook (27) in place.

7. Gas socket according to claim 6 with a protrusion (31) situated on the external side of each leg (26), and a limit stop (32) that is situated in the bonnet (18) to delimit the protrusion's (31) travel when the leg (26) opens against the reseat action of a spring.

8. Gas socket according to claim 1 with a cover (21) that is formed by a slider (38) which can move at an angle to the axis of the outlet socket (3).

9. Gas socket according to claim 1 with a cover (21) formed by two or more flaps (39).

* * * * *